US007432685B2

(12) United States Patent
Hayashi

(10) Patent No.: US 7,432,685 B2
(45) Date of Patent: Oct. 7, 2008

(54) BATTERY CHARGER AND CONTROL METHOD THEREFOR

(75) Inventor: Isao Hayashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/759,738

(22) Filed: Jun. 7, 2007

(65) Prior Publication Data

US 2007/0229037 A1 Oct. 4, 2007

Related U.S. Application Data

(63) Continuation of application No. 10/786,493, filed on Feb. 24, 2004, now abandoned.

(30) Foreign Application Priority Data

Feb. 25, 2003 (JP) ............................ 2003-047954
Feb. 25, 2003 (JP) ............................ 2003-047955

(51) Int. Cl.
*H01M 10/44* (2006.01)
*H01M 10/46* (2006.01)

(52) U.S. Cl. ...................................................... 320/128

(58) Field of Classification Search ................. 320/118, 320/128, 135, 136, 132, 152; 363/23, 26
See application file for complete search history.

(56) References Cited

U.S. PATENT DOCUMENTS 5,825,155 A 10/1998 Ito et al.
5,869,949 A 2/1999 Nishikawa et al.
5,994,875 A 11/1999 Lee
6,060,864 A 5/2000 Ito et al.
6,064,179 A 5/2000 Ito et al.
6,094,363 A 7/2000 Cheng
6,118,255 A 9/2000 Nagai et al.
6,133,711 A 10/2000 Hayashi et al.
6,456,044 B1 9/2002 Darmawaskita

FOREIGN PATENT DOCUMENTS

EP 1067285 1/2001
JP 05-168149 7/1993
JP 05-328625 12/1993
JP 10-094188 4/1998
JP 11-027869 1/1999
JP 11-069647 3/1999
JP 2000-050522 2/2000
JP 2000-333377 11/2000

*Primary Examiner*—Edward Tso
(74) *Attorney, Agent, or Firm*—Morgan & Finnegan, LLP

(57) ABSTRACT

To fully charge a battery by a multi-power-source battery charger either when a DC power having a voltage corresponding to the charging voltage of the battery is input or when a DC power having a voltage higher than the charging voltage of the battery is input, the supply destination of the input DC power is switched, in accordance with the voltage of the DC power input to the battery charger, between a controller which controls charging of the battery in accordance with the charging voltage of the battery and a DC/DC converter which controls the voltage and current of the DC power supplied to the battery through the controller.

2 Claims, 15 Drawing Sheets

DC INPUT JACK
19
20
DC INPUT JACK
2
5
DC / DC CONVERTER
21
9
10
8
REG
6
12
11
Sg
7
CHARGING CONTROL MPU
13
14
17
15
18
16
BATTERY
1

BATTERY
CHARGING CONTROL MPU
REG
DC / DC CONVERTER
VOLTAGE DETECTION SECTION
DC INPUT JACK
1
2
3
4
5
6
7
8
9
10
11
12
13
14
15
16
17
18

BATTERY
16
17
18
14
15
1
CHARGING CONTROL MPU
7
13
10
12
9
8
11
REG
6
DC / DC CONVERTER
5
DC INPUT JACK
19
DC INPUT JACK
2

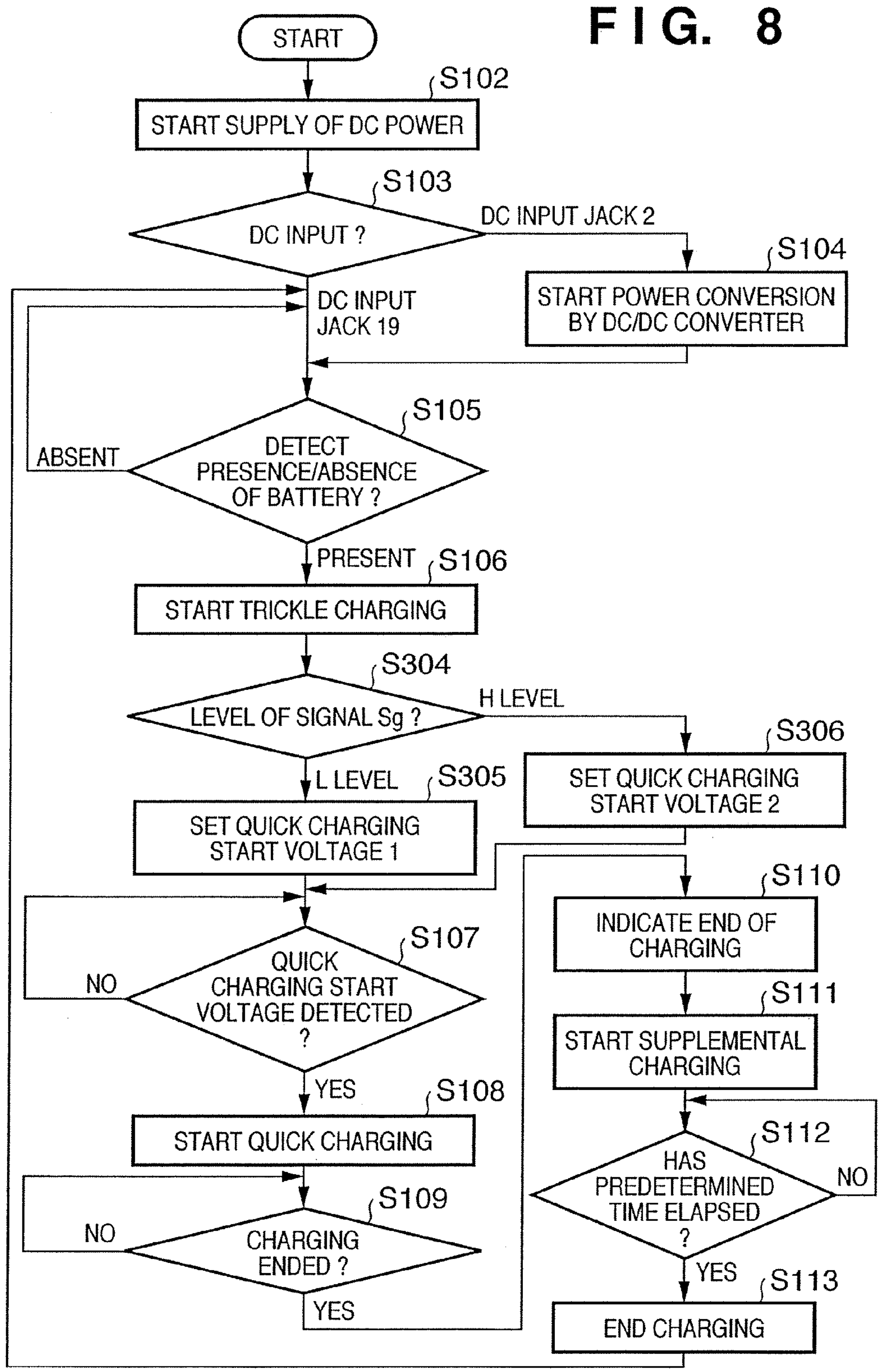
FIG. 8
START
S102
START SUPPLY OF DC POWER
S103
DC INPUT ?
DC INPUT JACK 2
S104
START POWER CONVERSION BY DC/DC CONVERTER
DC INPUT JACK 19
S105
DETECT PRESENCE/ABSENCE OF BATTERY ?
ABSENT
PRESENT
S106
START TRICKLE CHARGING
S304
LEVEL OF SIGNAL Sg ?
H LEVEL
L LEVEL
S305
SET QUICK CHARGING START VOLTAGE 1
S306
SET QUICK CHARGING START VOLTAGE 2
S107
QUICK CHARGING START VOLTAGE DETECTED ?
NO
YES
S108
START QUICK CHARGING
S109
CHARGING ENDED ?
NO
YES
S110
INDICATE END OF CHARGING
S111
START SUPPLEMENTAL CHARGING
S112
HAS PREDETERMINED TIME ELAPSED ?
NO
YES
S113
END CHARGING 107
113
110
106
12V / 24V
112
POWER ADAPTER
8.4V
109
POWER ADAPTER
9.5V
1
16
16
BATTERY
BATTERY
BATTERY CHARGER
DC INPUT JACK
DC INPUT JACK
2
108
111
19
114

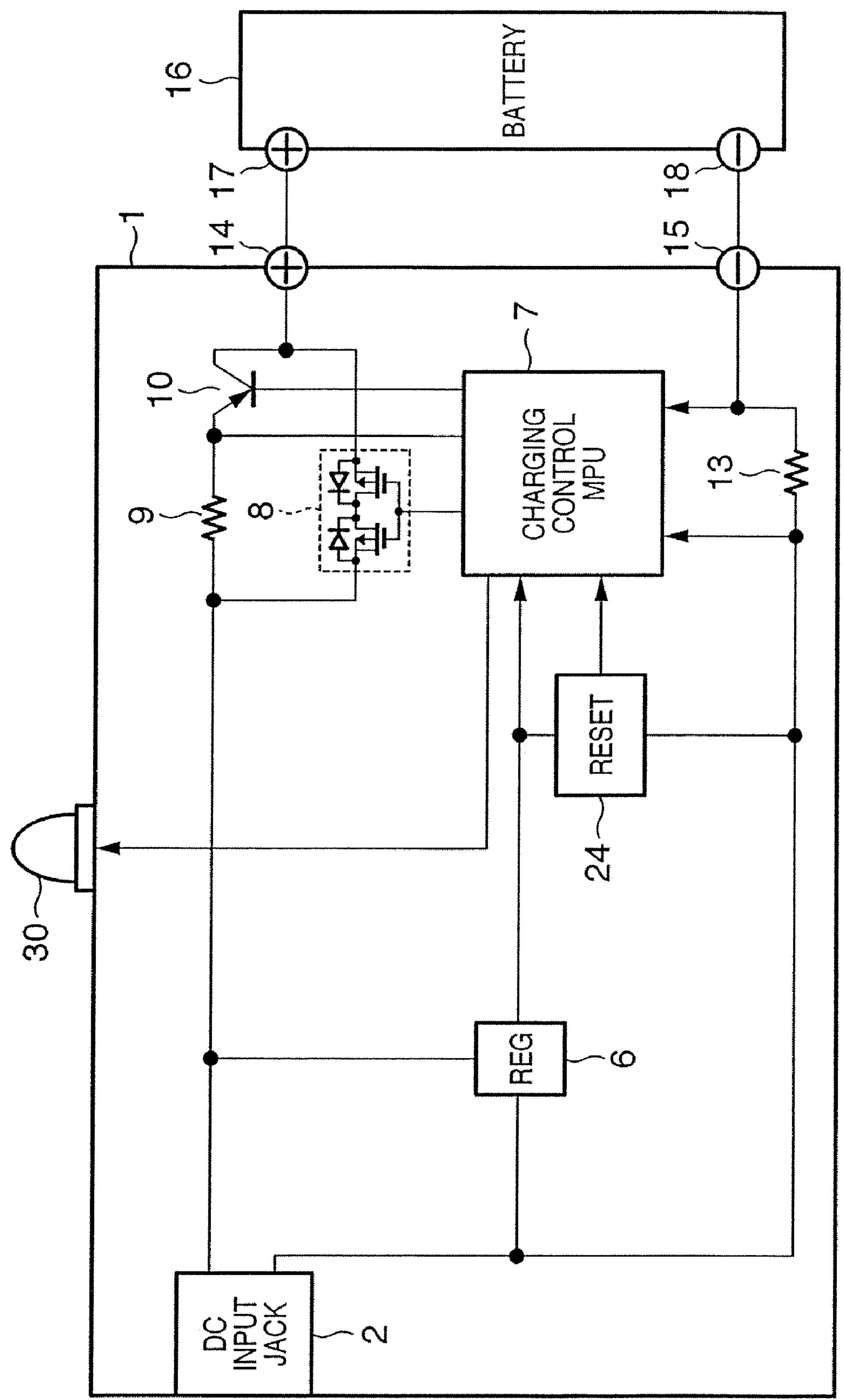
F I G. 11
BATTERY
16
17
18
14
15
1
7
10
CHARGING CONTROL MPU
9
8
13
RESET
24
30
REG
6
DC INPUT JACK
2

BATTERY CHARGER AND CONTROL METHOD THEREFOR

RELATED APPLICATION INFORMATION

This application is a continuation of U.S. application Ser. No. 10/786,493 filed Feb. 24, 2004, now abandoned, which is incorporated herein by reference.

FIELD OF THE INVENTION

The present invention relates to a battery charger and, more particularly, to a battery charger which executes constant-voltage/constant-current charging of a secondary battery such as a lithium-ion battery.

BACKGROUND OF THE INVENTION

FIG. 10 is a view showing the connection form of a charger and a power supply. Referring to FIG. 10, a charger 201 has a DC input jack 202 to receive supply of a DC power. The charger 201 can charge batteries 203 and 204. A car battery cable 205 has, at its two ends, a plug 206 to be connected to the receptacle of the cigarette lighter of a car and a DC input plug 207 which supplies the DC 12- or 24-V power of the car battery to the DC input jack 202. A power adapter 208 converts an AC power supplied from an AC input plug 209 into a DC 9.5-V power and supplies the DC power to the DC input jack 202 through a DC input plug 210.

As shown in FIG. 10, the charger 201 capable of receiving power from a plurality of power sources has a dedicated 3-terminal power supply connector (DC input jack 202) and generates the charging voltage of the battery 203 or 204 through a DC/DC converter.

The charger of this type always generates the charging voltage by using the DC/DC converter. For this reason, when a DC power equal to the charging voltage of the battery is input from an external power supply apparatus, the charging voltage of the battery cannot be obtained. Hence, the battery cannot fully be charged.

Charging is sometimes executed by using a power supply apparatus which can supply a DC power to an electronic device and simultaneously execute constant-voltage/constant-current control according to the battery charging conditions. Generally, the power supply apparatus is designed to cope with a rush current of an electronic device by canceling constant-current control or changing the constant-current control value when the output voltage drops. Hence, under normal quick charging start conditions, an excessively large charging current may flow to the battery to damage it or shorten its service life.

A charger which executes battery charging control by using a power supply for executing constant-voltage/constant-current control for battery charging or a power adapter for receiving an AC power and, for example, a charger shown in FIG. 15 is known. Referring to FIG. 15, the charger 201 executes constant-voltage/constant-current control of a DC power supplied from the plug 206 to charge the battery 203. Generally, backflow of the DC power from the battery 203 is prevented by arranging a blocking element such as a diode on the output side of the power adapter or on the input side of the charger 201.

However, when a blocking element is inserted to the power supply line, as described above, a large-capacitance element that allows the charging current must be used. This is disadvantageous for cost. In some cases, no sufficient charging voltage can be supplied to the battery 203 due to a voltage drop in the blocking element, or the battery cannot fully be charged due to a variation between elements.

SUMMARY OF THE INVENTION

The present invention has been made to solve the above-described problems individually or altogether, and has as its object to fully charge a battery by using a multi-power-source battery charger either when a DC power having a voltage corresponding to the charging voltage of the battery is input or when a DC power having a voltage higher than the charging voltage of the battery is input.

In order to achieve the above object, according to a preferred aspect of the present invention, there is provided a battery charger for charging a battery, comprising:

A controller which detects a charging voltage and charging current of the battery and controls charging of the battery in accordance with a detection result;

A converter which controls a voltage and current of a DC power supplied to the battery; and A switch which sets a supply destination of the input DC power to one of the converter and the controller connected to an output of the converter in accordance with the voltage of the input DC power.

It is another object of the present invention to reliably prevent any disadvantage of stop of DC power input to a battery charger without using any blocking element.

In order to achieve the above object, according to another preferred aspect of the present invention, there is provided a battery charger for charging a battery, comprising:

A controller which detects a charging voltage and charging current of the battery and controls charging of the battery in accordance with a detection result;

A connector which charges the battery from a detachable plug and receives supply of a DC power that operates the controller; and A reset unit which resets an operation of the controller when a voltage supplied to the controller decreases, Wherein the controller executes intermittent charging when the charging current is not more than a first threshold value $I_{th1}$.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a flow chart for explaining the charging operation of the charger according to the third embodiment;

FIG. 11 is a block diagram showing the arrangement of a charger according to the fourth embodiment;

DETAILED DESCRIPTION OF THE PREFERRED EMBODIMENTS

A battery charger according to the present invention will be described next with reference to the accompanying drawings.

First Embodiment

[Arrangement]

Figure 1:
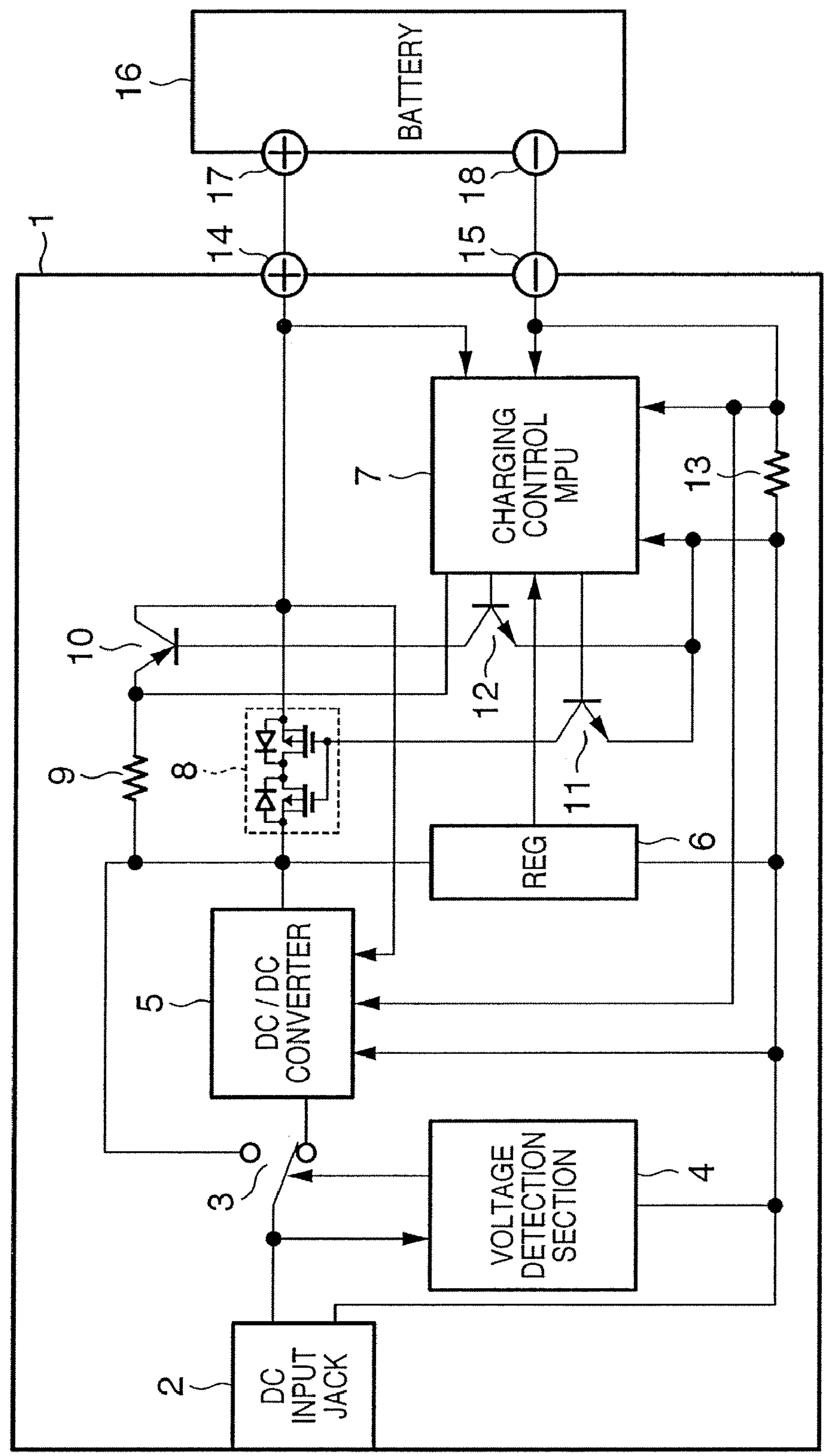
FIG. 1 is a block diagram showing the arrangement of a multi-power-source charger according to the first embodiment.

FIG. 1 is a block diagram showing the arrangement of a multi-power-source charger according to the first embodiment.

Referring to FIG. 1, a charger 1 has a DC input jack 2 which receives a DC power supply, a DC input selector switch 3, a voltage detection section 4 which detects the voltage of the DC input, a DC/DC converter 5 for constant-voltage/constant-current control, a regulator 6 which supplies a DC power having a predetermined voltage to an MPU (microcontroller) 7 and the like, the charging control MPU, a semiconductor switch 8 which turns on/off quick charging, a resistor 9 which limits the charging current for trickle charging, a semiconductor switch 10 which turns on/off trickle charging, a semiconductor switch 11 which controls quick charging, a semiconductor switch 12 which controls trickle charging, a resistor 13 which detects the charging current, and terminals 14 and 15 to which electrodes 17 and 18 of a battery 16 are connected.

A power supply having the same voltage as that for charging the battery 16 or a power supply having a different voltage is connected to the DC input jack 2. The voltage detection section 4 detects whether the voltage (to be referred to as a "DC input voltage" hereinafter) Vin input to the DC input jack 2 is higher than a charging voltage Vcharge of the battery 16. When the DC input voltage is higher than the charging voltage of the battery 16 (Vin>Vcharge), the voltage detection section 4 connects the DC input selector switch 3 to the side of the DC/DC converter 5. The DC/DC converter 5 reduces the DC input voltage to the charging voltage of the battery 16 so that constant-voltage/constant-current control by the charging control MPU 7 can be executed.

When Vin is only slightly higher than Vcharge, constant-voltage/constant-current control by the DC/DC converter 5 may be difficult. In addition, it is not preferable to supply a voltage higher than Vcharge. However, the present invention assumes that a DC input voltage Vin1 (>Vcharge) which allows constant-voltage/constant-current control by the DC/DC converter 5 without any problem, or a DC input voltage Vin2 (<Vin1) that can be supplied to the battery 16 without any problem is supplied. Assume that the minimum input voltage that guarantees the operation of the DC/DC converter 5 is Vcharge+Vm. In this case, when Vin≧Vcharge+Vm, the switch 3 is preferably connected to the input side of the DC/DC converter 5. When Vin<Vcharge+Vm, the switch 3 is preferably connected to the output side of the DC/DC converter 5. The value Vm should appropriately be set in consideration of the arrangement of the charger 1 including the DC/DC converter 5, the value Vcharge, and errors and variations in Vin1 and Vin2.

Upon detecting that the battery 16 is connected to the terminals 14 and 15, the MPU 7 controls from trickle charging to quick charging and supplement charging. After the end of charging of the battery 16, charging control is ended. The trickle charging of this embodiment is executed to restore the voltage of the battery 16, which has reduced by over-discharging. In the trickle charging, the battery 16 is charged by a smaller current than normal charging.

On the other hand, when the DC input voltage is equal to or lower than the charging voltage of the battery 16 (Vin≦Vcharge), the voltage detection section 4 connects the DC input selector switch 3 to the output side of the DC/DC converter 5 to directly use the voltage input to the DC input jack 2 as the charging voltage of the battery 16. In this input, the input DC power is constant-voltage/constant-current-controlled. Hence, when the battery 16 is quickly charged, the DC input voltage varies like the terminal voltage of the battery 16. Charging control of the MPU 7 is the same as in the case wherein the DC/DC converter 5 intervenes.

When the charger 1 has the above arrangement, any decrease in voltage due to the use of the DC/DC converter 5 for a DC input voltage equal to or lower than the charging voltage of the battery 16 can be prevented, and the battery 16 can fully be charged. In FIG. 1, the general circuit components (e.g., the protection circuit) of the charger 1, which are unnecessary for the description of the present invention, are not illustrated.

[Charging Control Characteristic]

Figure 2:
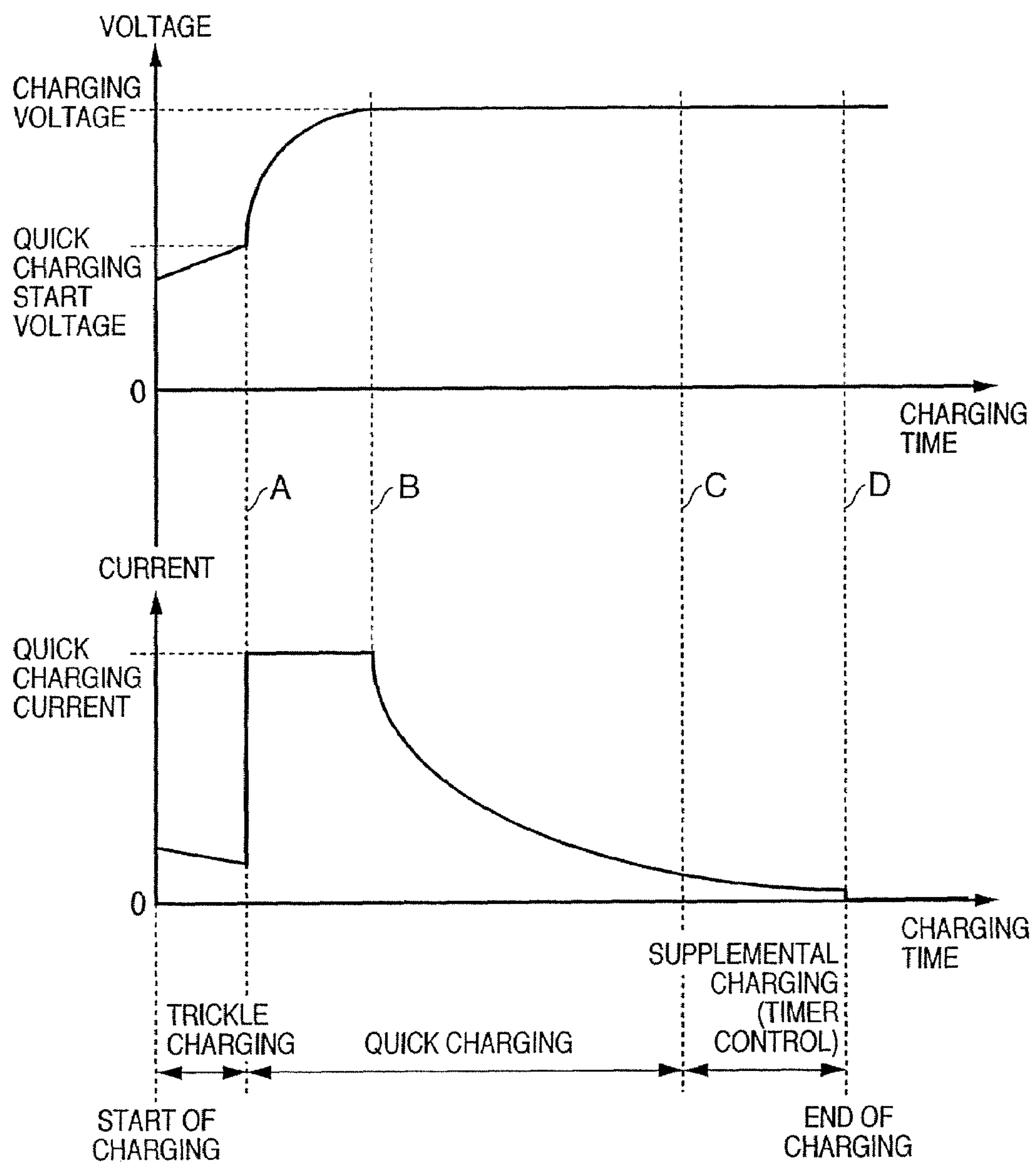
FIG. 2 is a graph showing a charging control characteristic by the charger.

FIG. 2 is a graph showing a charging control characteristic by the charger 1. Referring to FIG. 2, a lithium-ion secondary battery is assumed as the battery 16. The upper portion of FIG. 2 represents a change in terminal voltage (to be referred to as a "battery voltage" hereinafter) of the battery 16 during charging. The lower portion of FIG. 2 represents a change in charging current with respect to the change in battery voltage.

As shown in FIG. 2, the MPU 7 turns on the switches 12 and 10 to execute trickle charging until the battery voltage reaches the quick charging start voltage. When the battery voltage rises to the quick charging start voltage (timing A), the switches 12 and 10 are turned off. The MPU 7 turns on the switches 11 and 8 to start quick charging to supply the quick charging current to the battery 16. After that, the battery voltage rises to the charging voltage (timing B). During the period (quick charging period) from the timing A to the timing B, the DC/DC converter 5 executes constant-current control. From the timing B, the DC/DC converter 5 shifts to constant-voltage control. The charging current decreases in accordance with the charged state of the battery 16. When the charging current decreases to a preset value (timing C), the MPU 7 indicates the end of charging by using, e.g., an indicator (not shown), and supplement charging starts. This supplement charging is generally controlled by a timer and ended as a set time elapses (timing D).

[Charging Control]

Figure 3:
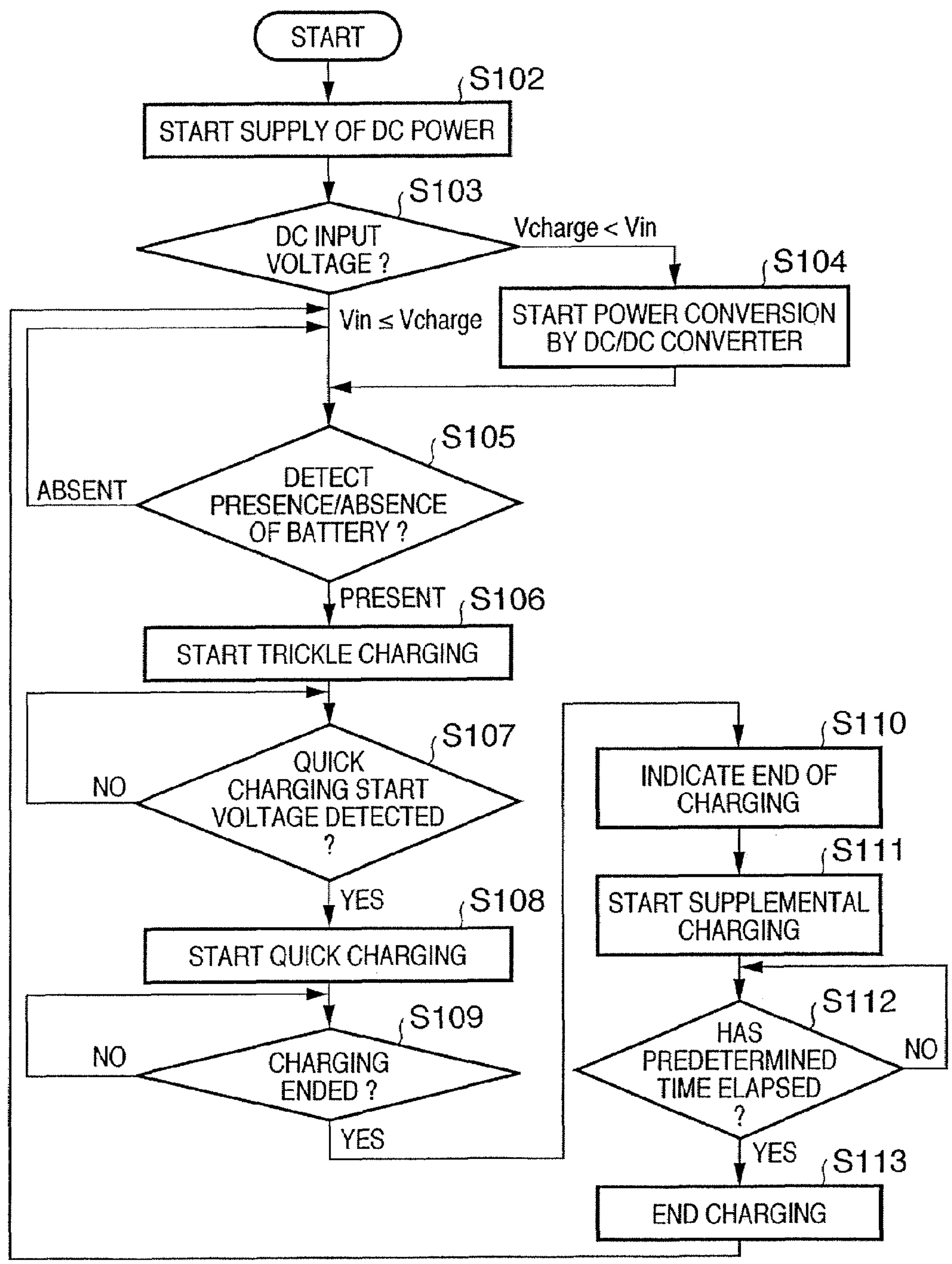
FIG. 3 is a flow chart for explaining the charging operation of the charger.

FIG. 3 is a flow chart for explaining the charging operation of the charger 1 and MPU 7.

When a DC power is supplied to the DC input jack 2 (S102), the voltage detection section 4 determines whether the DC input voltage Vin is higher than the charging voltage Vcharge of the battery 16 (S103). If the determination result indicates that the DC input voltage Vin is higher than the charging voltage Vcharge of the battery 16, the switch 3 connects the DC input jack 2 to the input side of the DC/DC converter 5 so that power conversion by the DC/DC converter 5 starts (S104).

Upon detecting connection of the battery 16, the MPU 7 turns on the switch 12 for trickle charging control and the switch 10 for trickle charging ON/OFF control to start trickle charging (S106). Connection of the battery 16 is detected by detecting the terminal voltage of the battery 16 or by using a sensor or switch (not shown) arranged at a portion where the battery 16 is attached to the charger 1.

Next, the MPU 7 detects the battery voltage (S107). Upon detecting that the battery voltage has risen to the quick charging start voltage, the MPU 7 turns off the switch 12 for trickle charging control, and turns on the switch 11 for quick charging control, thus the switch 8 for quick charging ON/OFF control is turned on to start quick charging (S108).

When the battery voltage has risen to the charging voltage, and the charging current has decreased to a set value as charging progresses, the MPU 7 detects the end of charging (S109). The MPU 7 indicates the end of charging (S110) and starts the timer for supplement charging (S111). When a predetermined time has elapsed (S112), the MPU 7 turns on the switch 11 for quick charging control (S113). The flow returns to step S105.

Upon detecting that the battery 16 is disconnected from the charger 1, or the charging current has become zero during charging, the MPU 7 turns on the switches 11 and 12 to end charging (S113). Then, the flow returns to step S105.

As described above, according to the first embodiment, the operation of charging the battery 16 by causing the DC/DC converter 5 to drop the voltage or the operation of charging the battery 16 without intervening the DC/DC converter 5 is selected in accordance with whether the supplied DC input voltage is higher than the charging voltage of the battery 16. Even when a DC power equal to the charging voltage of the battery 16, which is constant-voltage/constant-current-controlled, is supplied to the charger 1, the battery 16 can fully be charged.

Second Embodiment

Figure 4:
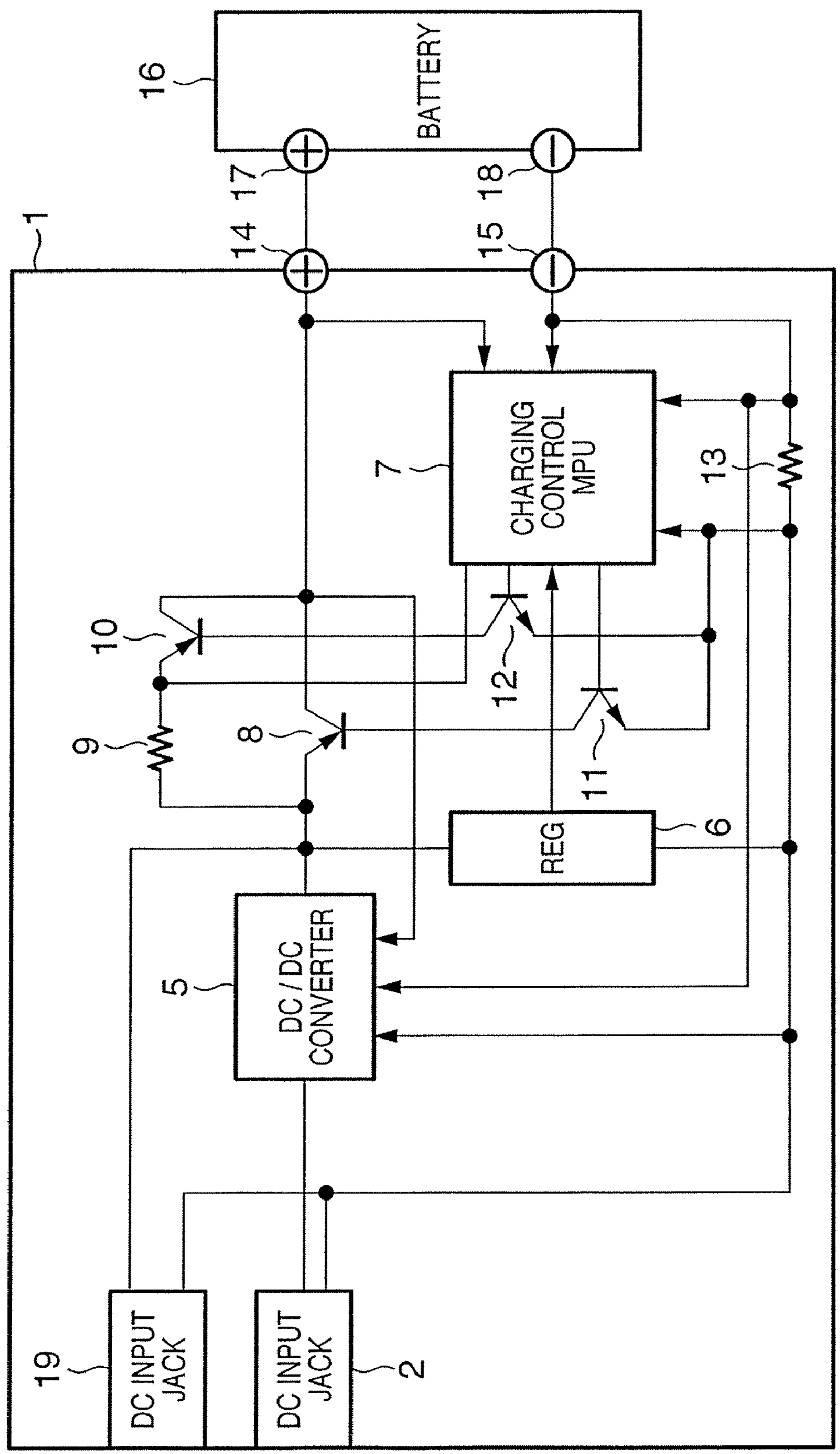
FIG. 4 is a block diagram showing the arrangement of a charger according to the second embodiment.

FIG. 4 is a block diagram showing the arrangement of a multi-power-source charger according to the second embodiment. The same reference numerals as in the first embodiment denote the same components in the second embodiment, and a detailed description thereof will be omitted.

A charger 1 shown in FIG. 4 has a dedicated DC input jack 19 to which a constant-voltage/constant-current-controlled DC power is supplied to charge a battery 16. The voltage detection section 4 and switch 3 shown in FIG. 1 are omitted. A DC input jack 2 and the DC input jack 19 have different shapes or sizes so that they can receive only dedicated plugs. In the first embodiment, use/nonuse of a DC/DC converter 5 is electrically switched by detecting the input voltage by the voltage detection section 4. However, in the second embodiment with the above arrangement, use/nonuse of a DC/DC converter 5 is switched by the jack to which a DC power is supplied. The remaining operations of charging control are the same as in the first embodiment.

Figure 5:
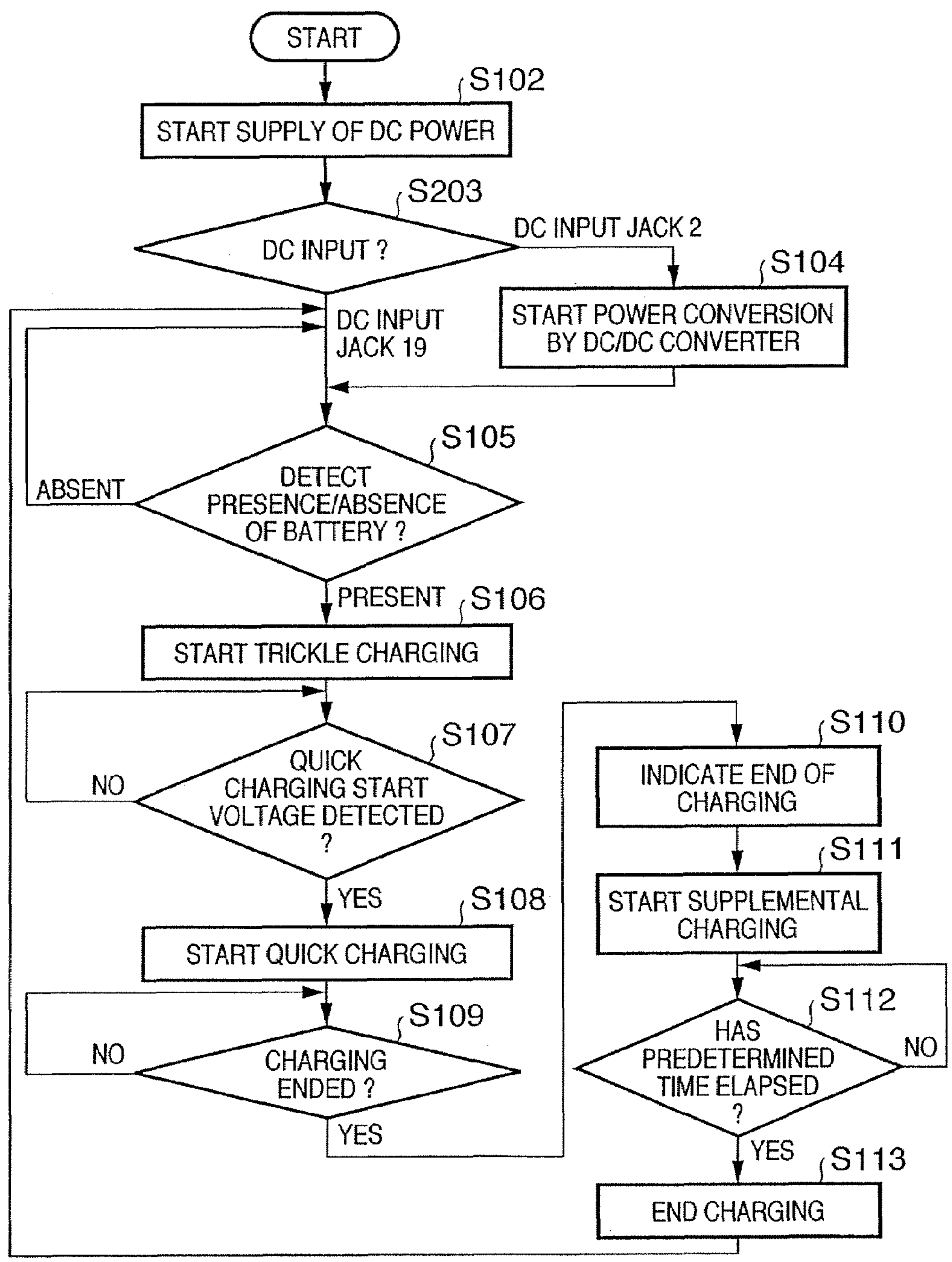
FIG. 5 is a flow chart for explaining the charging operation of the charger according to the second embodiment.

FIG. 5 is a flow chart for explaining the charging operation of the charger 1 according to the second embodiment. In the first embodiment, the operation branches in accordance with the DC input voltage (S103). The second embodiment is different from the first embodiment in that the operation branches in accordance with the DC input jack to which the DC power is supplied (S203). The remaining operations and processes are the same as in the first embodiment.

As described above, according to the second embodiment, the charger 1 has the DC input jack 19 to which a constant-voltage/constant-current-controlled DC input voltage suitable for charging of the battery is supplied, and the DC input jack 2 to which a DC input voltage sufficiently higher than the charging voltage of the battery 16 is supplied. The DC input jacks 2 and 19 have different shapes. Hence, in either case, the battery 16 can fully be charged.

Third Embodiment

[Arrangement]

Figure 6:
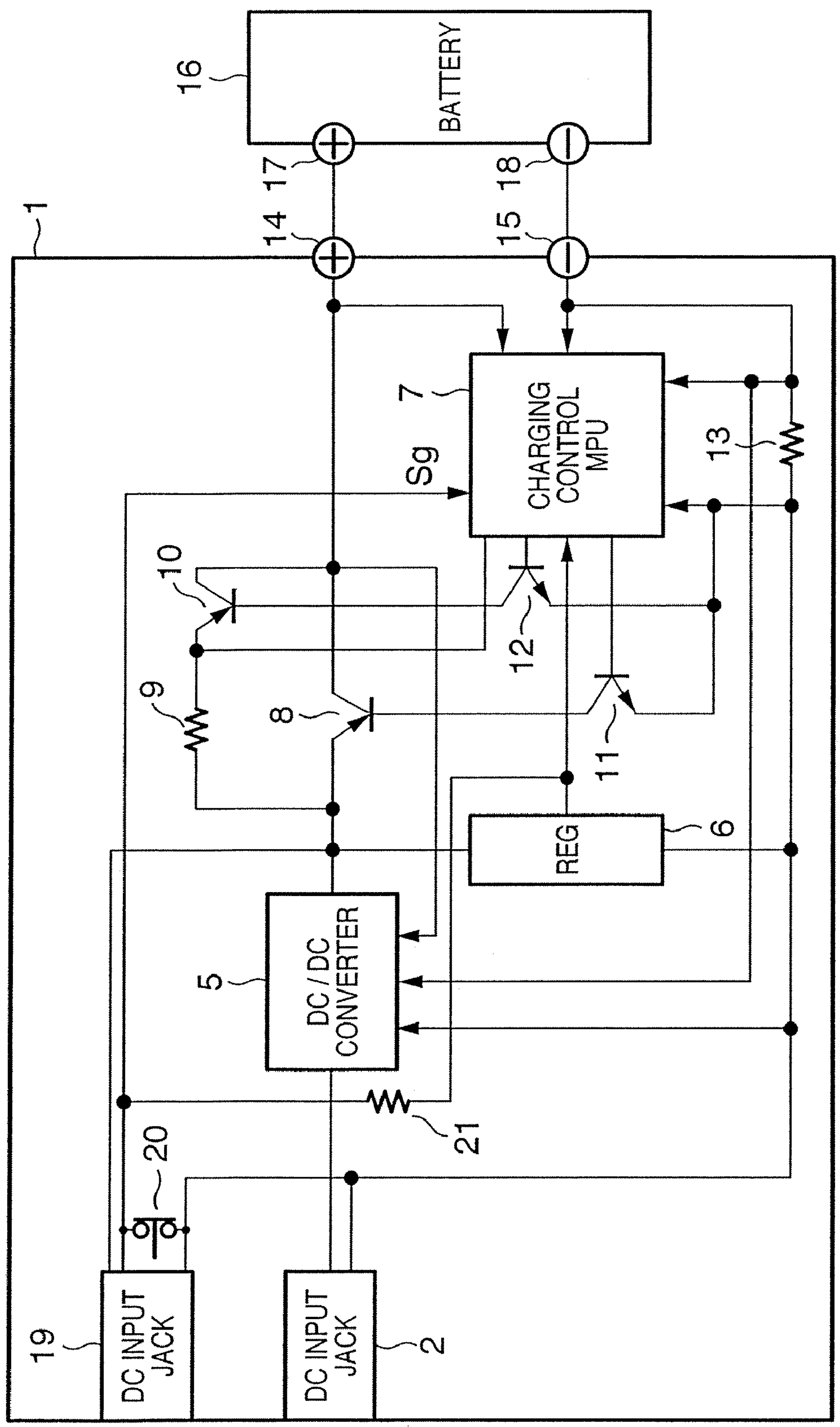
FIG. 6 is a block diagram showing the arrangement of a charger according to the third embodiment.

FIG. 6 is a block diagram showing the arrangement of a multi-power-source charger according to the third embodiment. The same reference numerals as in the first and second embodiments denote the same components in the third embodiment, and a detailed description thereof will be omitted.

A charger 1 shown in FIG. 6 has a switch 20 which detects the insertion/removal of a DC input plug, and a pull-up resistor 21. When no DC input plug (not shown) is inserted to a DC input jack 19, the switch 20 is ON, and a signal Sg having a voltage of 0 V (L level) is input to an MPU 7. When a DC input plug is inserted, the switch 20 is turned off so that the signal Sg having a voltage (H level) almost equal to the power supply voltage of the MPU 7 is input to the MPU 7 through the pull-up resistor 21. Hence, the MPU 7 can know by the signal Sg whether a DC input plug is inserted to the DC input jack 19.

When a DC power is supplied from the DC input jack 19, the MPU 7 sets the quick charging start voltage (to be referred to as a "quick charging start voltage 2" hereinafter) to be higher than the quick charging start voltage (to be referred to as a "quick charging start voltage 1" hereinafter) of a battery 16 in the first or second embodiment. The MPU 7 switches setting of the charging start voltage on a program. Alternatively, for example, two voltage dividers may be prepared on the charging voltage detection line of the MPU 7. In this case, selection of the voltage divider is switched by hardware in accordance with the signal Sg to switch setting of the quick charging start voltage.

FIG. 6 shows that the method switches the setting of the quick charging start voltage, however, there is a case that the quick charging start voltage is not switched, when the quick start charging voltage exceeds the voltage to be supplied to the electric device.

[Charging Control Characteristic]

Figure 7:
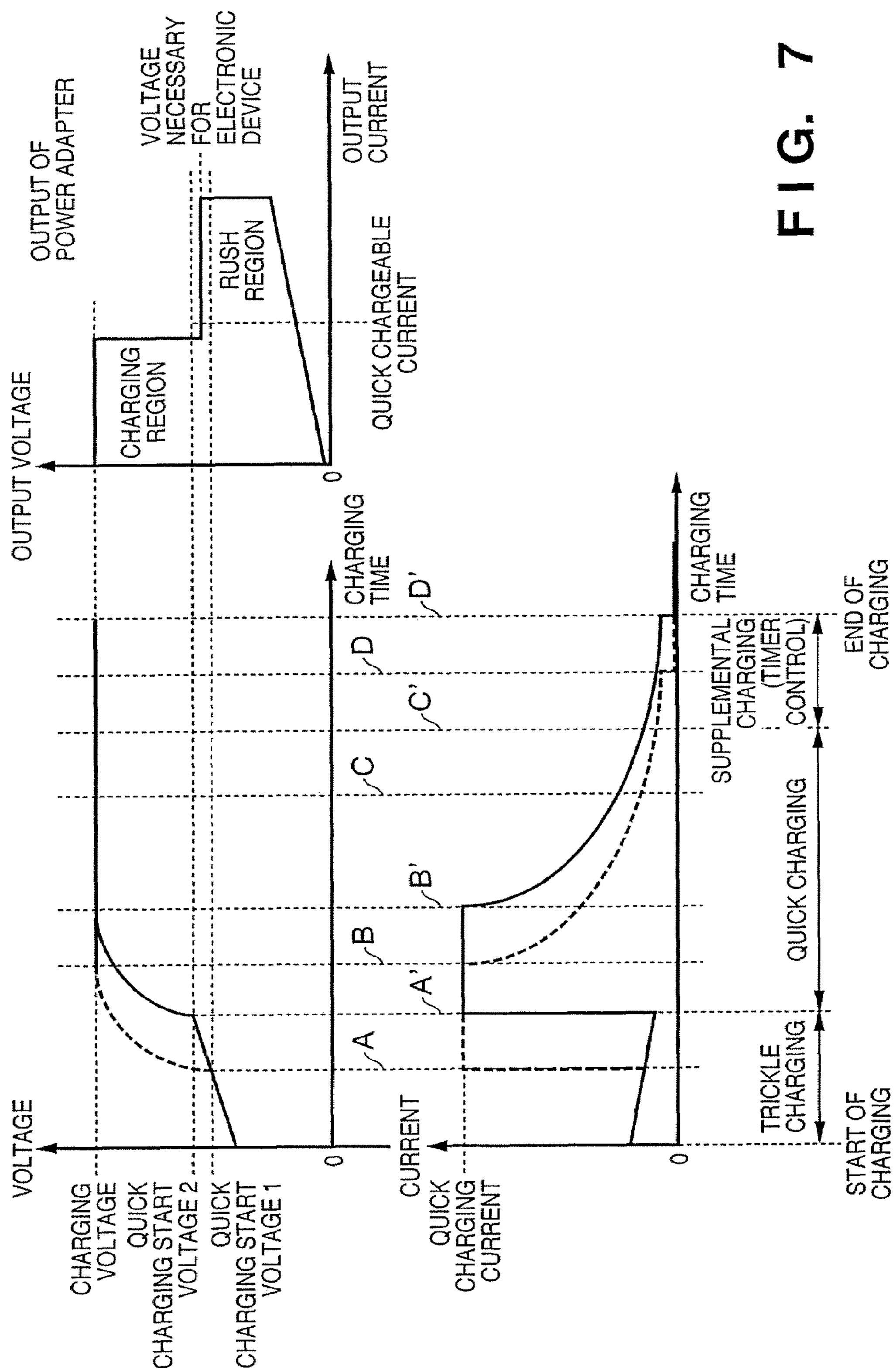
FIG. 7 is a graph showing a charging control characteristic when a DC power is supplied from a DC input jack 19.

FIG. 7 is a graph showing a charging control characteristic when a DC power is supplied from the DC input jack 19.

The output characteristic of a power adapter connected to the DC input jack 19 is shown at the upper right corner of FIG. 7. The output characteristic of the power adapter has a charging region and a rush region to deal with a rush current generated in the normal operation of an electronic device. The power adapter is not only connected to the charger 1 but also designed to be usable as a power supply for an electronic device to which the battery 16 is attached. However, the rush current of an electronic device exceeds the maximum permissible charging current (quick chargeable current) of the battery 16. For this reason, the DC power output from the power adapter cannot directly be supplied to the battery 16.

The voltage necessary for an electronic device is generally higher than the quick charging start voltage (quick charging start voltage 1) of the battery 16. In the third embodiment, the quick charging start voltage 2 is used as a condition. When a DC power is supplied from the DC input jack 19, control is executed such that quick charging starts simultaneously as the battery voltage exceeds the quick charging start voltage 2. In other words, when the battery voltage exceeds the voltage necessary for the electronic device, the output characteristic of the power adapter enters the charging region. As shown at the upper right corner of FIG. 7, no current more than the quick chargeable current is output from the power adapter. Hence, after the battery voltage exceeds the voltage necessary for the electronic device by trickle charging and exceeds the quick charging start voltage 2, quick charging is started. With this operation, appropriate quick charging can be executed.

FIG. 7 shows the relationship between the charging voltage and the charging current under such control. Trickle charging is performed until the quick charging start voltage 2 (timing A'). Quick charging starts from the timing A'. Constant-current control (quick charging) is executed until a timing B'. When the battery voltage has reached the charging voltage of the battery 16, the control shifts to constant-voltage control. The charging current decreases in accordance with the charged state of the battery 16. When the charging current decreases to a preset current value (timing C'), supplement charging starts. The charging is ended by the above-described timer control (timing D').

[Charging Control]

FIG. 8 is a flow chart for explaining the charging operation of the charger 1. In the first embodiment, the operation branches in accordance with the DC input voltage (S103). The third embodiment is different from the first embodiment in that the operation branches in accordance with the DC input jack (S203), as in the second embodiment, and that the quick charging start voltage is set in accordance with the level of the signal Sg after the start of trickle charging (S304 to S306). The remaining operations and processes are the same as in the first embodiment.

[Connection Form of Charger and Power Adapter]

Figure 9:
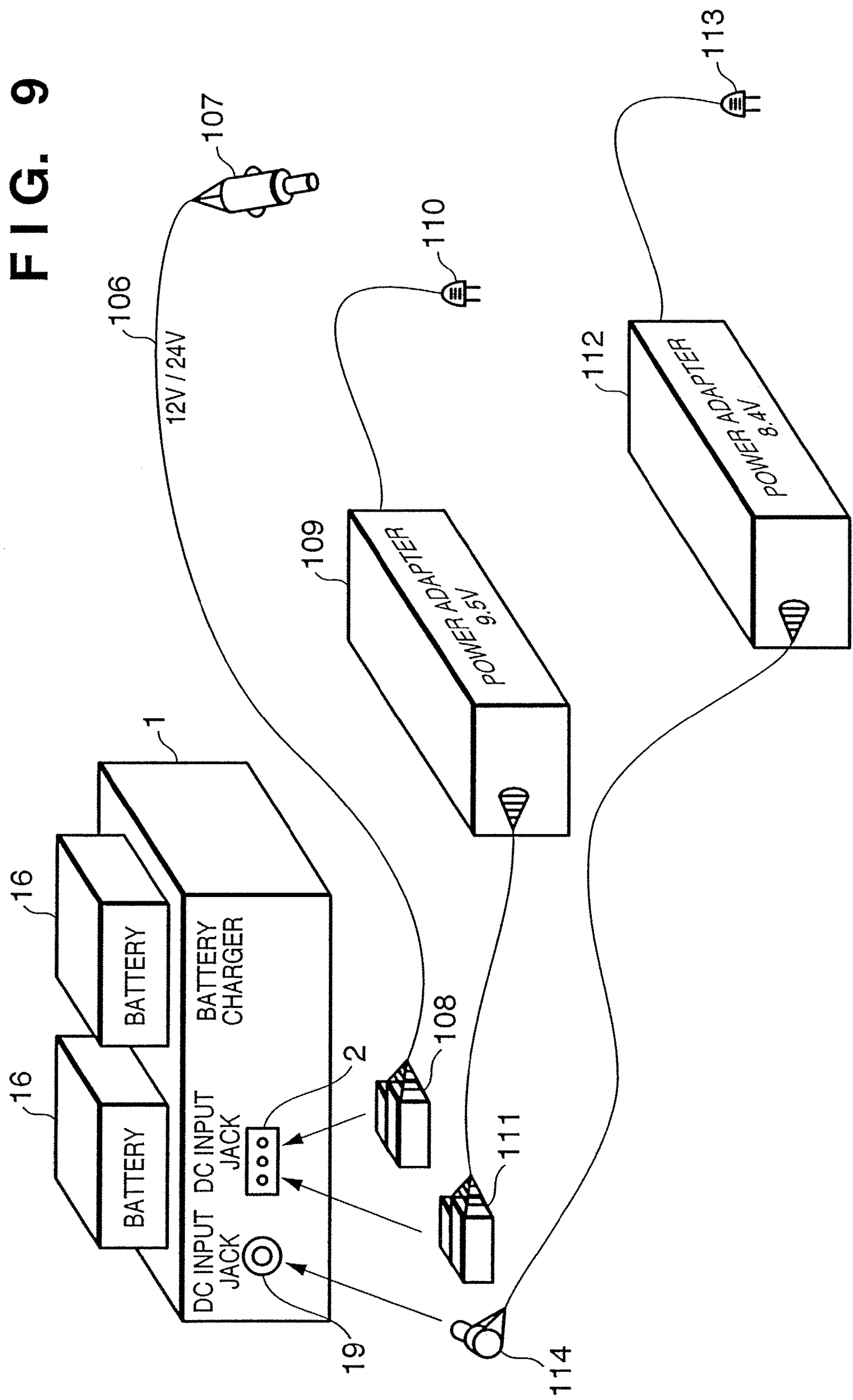
FIG. 9 is a view showing an example of a connection form of the charger and a power adapter according to the third embodiment.
Figure 10:
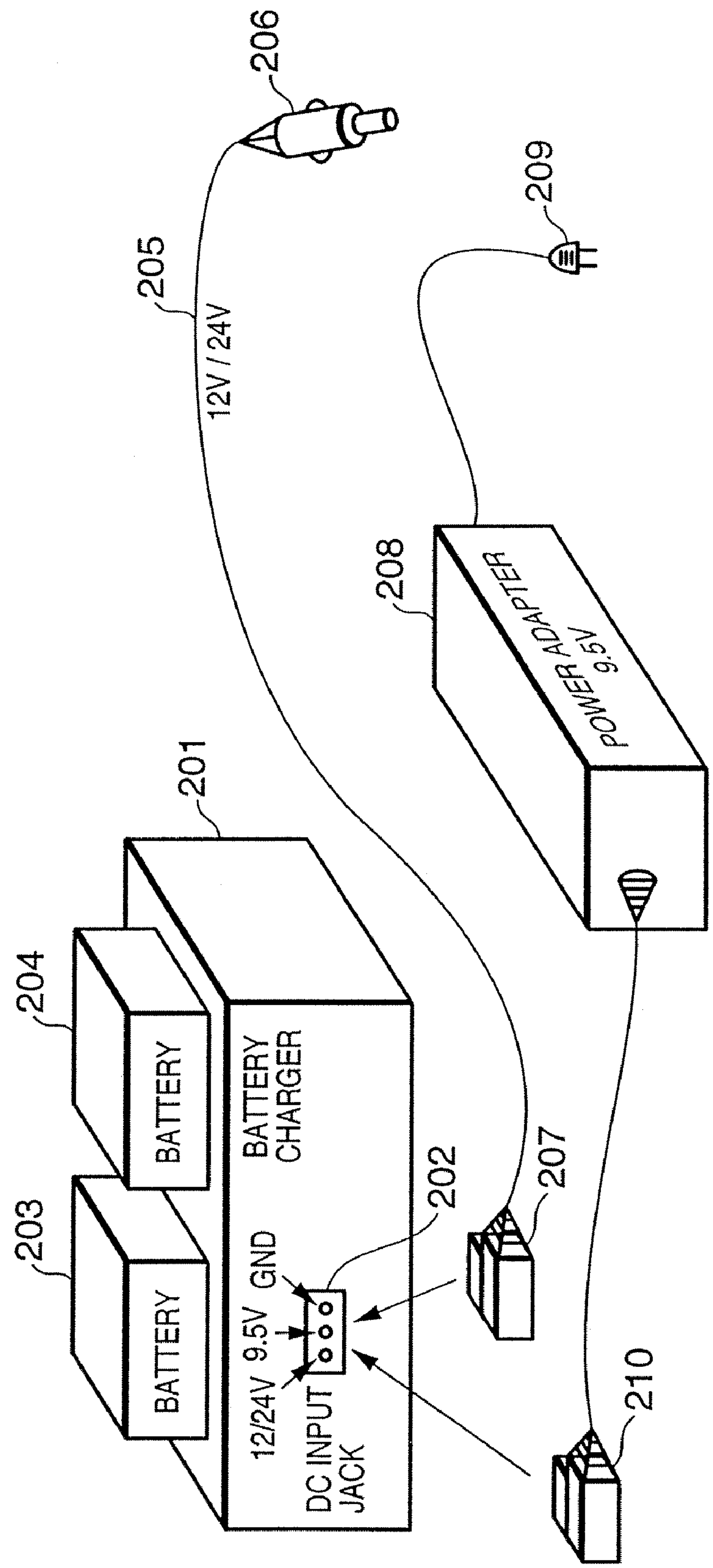
FIG. 10 is a view showing the connection form of a charger and a power supply.

FIG. 9 is a view showing an example of a connection form of the charger 1 and a power adapter according to the third embodiment.

Referring to FIG. 9, the charger 1 can charge two batteries 16. A car battery cable 106 has, at its two ends, a plug 107 to be connected to the receptacle of the cigarette lighter of a car and a DC input plug 108 which supplies a DC 12- or 24-V power to a DC input plug 2. A power adapter 109 converts an AC power supplied from an AC input plug 110 into a DC 9.5-V power and supplies the DC power to the DC input jack 2 through a DC input plug 111. A power adapter 112 converts an AC power supplied from an AC input plug 113 into a DC 8.4-V, executes constant-voltage/constant-current-control for charging of the battery 16, and supplies the DC power, which has the output characteristic shown in the upper right of FIG. 7, to the DC input jack 19 through a DC input plug 114.

As described above, according to the third embodiment, when the power adapter 112 having an output characteristic that takes battery charging into consideration is connected to the charger 1, the quick charging start voltage is set higher than the voltage necessary for an electronic device. Accordingly, the battery 16 can fully be charged safely and appropriately.

Fourth Embodiment

[Arrangement]

FIG. 11 is a block diagram showing the arrangement of a charger according to the fourth embodiment. The same reference numerals as in the first to third embodiments denote the same components in the fourth embodiment, and a detailed description thereof will be omitted.

A charger 1 shown in FIG. 11 has a charging indicating LED 30.

A constant-voltage/constant-current-controlled DC voltage suitable for charging of a battery 16 is input to a DC input jack 2. As in the first embodiment, upon detecting that the battery 16 is connected to terminals 14 and 15, a charging control MPU 7 controls from trickle charging to quick charging and supplement charging. After the end of charging of the battery 16, charging control is ended.

The DC power input to the DC input jack 2 is constant-voltage/constant-current-controlled. Hence, during quick charging of the battery 16, the input voltage varies almost like the terminal voltage of the battery 16.

The arrangement shown in FIG. 11 does not stop charging upon detecting a decrease in input voltage. For this reason, if the DC input plug connected to the DC input jack 2 is disconnected during charging, the power flows back from the battery 16. A switch 8 or 10 is kept ON, and the backflow continues even though there is no DC input power. The charging indicating LED 30 is kept ON or blinked to cause an indication error.

To prevent this, the MPU 7 detects the voltage across a resistor 13 for current detection, which is proportional to the charging current. When the detected voltage is equal to or lower than a preset voltage, the switch 8 for quick charging or the switch 10 for trickle charging is repeatedly turned on/off. If the DC input plug is disconnected during charging, and switches 10 and 8 are turned off, the input voltage to a regulator 6 decreases. A reset IC 24 operates to reset the MPU 7 so the charging operation of the MPU 7 stops. Since the OFF state of the switches 10 and 8 is maintained, no backflow from the battery 16 occurs. The current value (threshold value) at which intermittent charging starts is decided in consideration of the power consumed by the regulator 6, MPU 7, and LED 30. In FIG. 11, the general circuit components of the charger 1, which are unnecessary for the description of the present invention, are not illustrated.

[Charging Control Characteristic]

Figure 12:
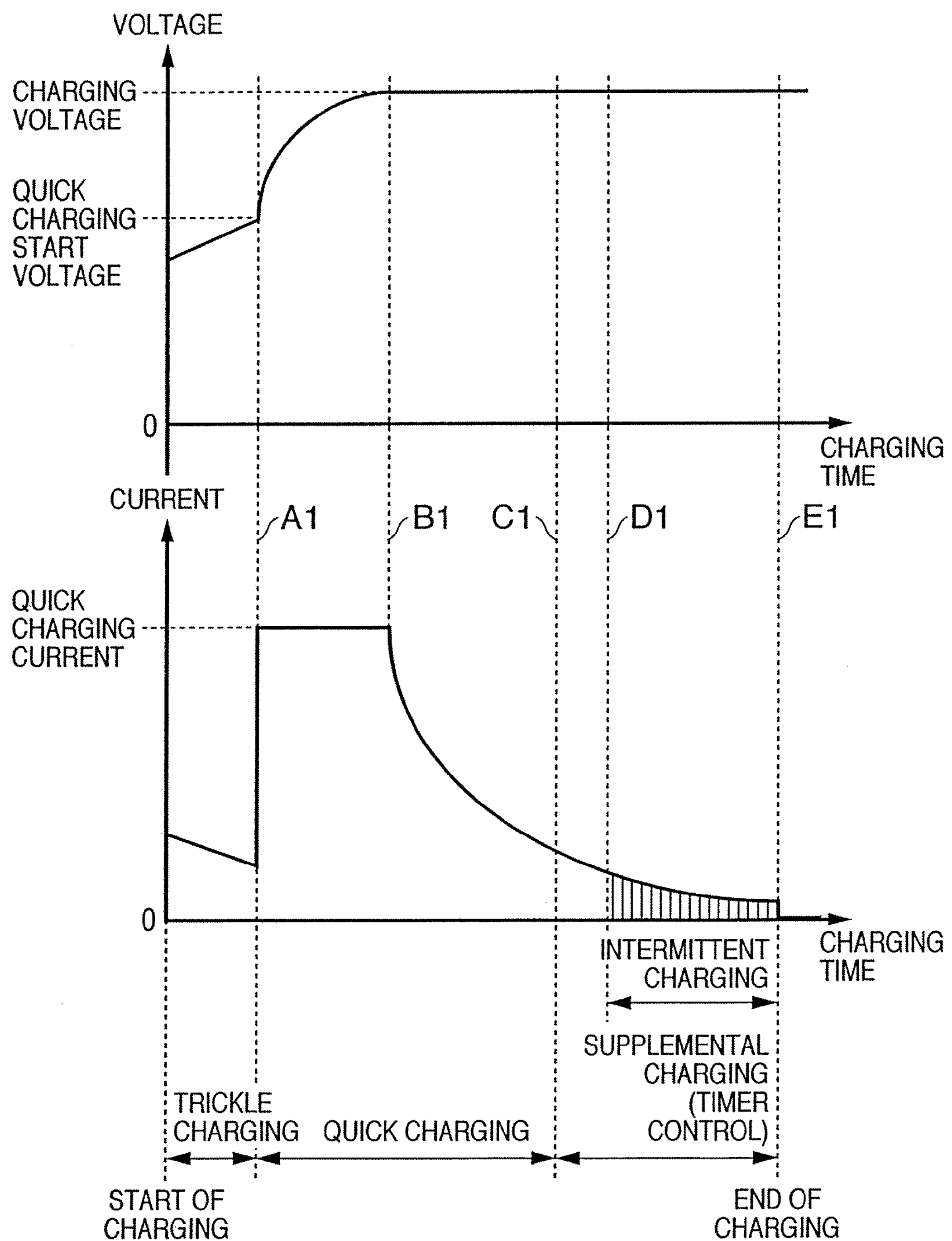
FIG. 12 is a graph showing a charging control characteristic by the charger.

FIG. 12 is a graph showing a charging control characteristic by the charger 1. Referring to FIG. 12, a lithium-ion secondary battery is assumed as the battery 16. The upper portion of FIG. 12 represents a change in battery voltage during charging. The lower portion of FIG. 12 represents a change in charging current with respect to the change in battery voltage.

As shown in FIG. 12, the MPU 7 turns on the switch 10 to execute trickle charging and indicate during the trickle charging by, ex., blinking the LED 30 until the battery voltage reaches the quick charging start voltage. When the battery voltage rises to the quick charging start voltage (timing A1), the trickle charging is finished by turning off the switch 10, and quick charging starts to supply a quick charging current to the battery 16 by turning on the switch 8. During the period (quick charging period) from the timing A1 to a timing B1, an external DC/DC converter executes constant-current control. After that, when the battery voltage rises to the battery charging voltage (timing B1), the external DC/DC converter shifts to constant-voltage control. The charging current decreases in accordance with the charged state of the battery 16. When the charging current decreases to a value preset to detect the end of charging (timing C1), the MPU 7 causes the charging indicating LED 30 to indicate the end of charging (e.g., the LED 30 lights up), and supplement charging starts. When the charging current decreases to a preset value (timing D1), intermittent charging starts in which the switch 8 repeatedly turned on/off. The supplement charging is generally controlled by a timer and ended as a set time elapses (timing E1).

[Charging Control]

Figure 13:
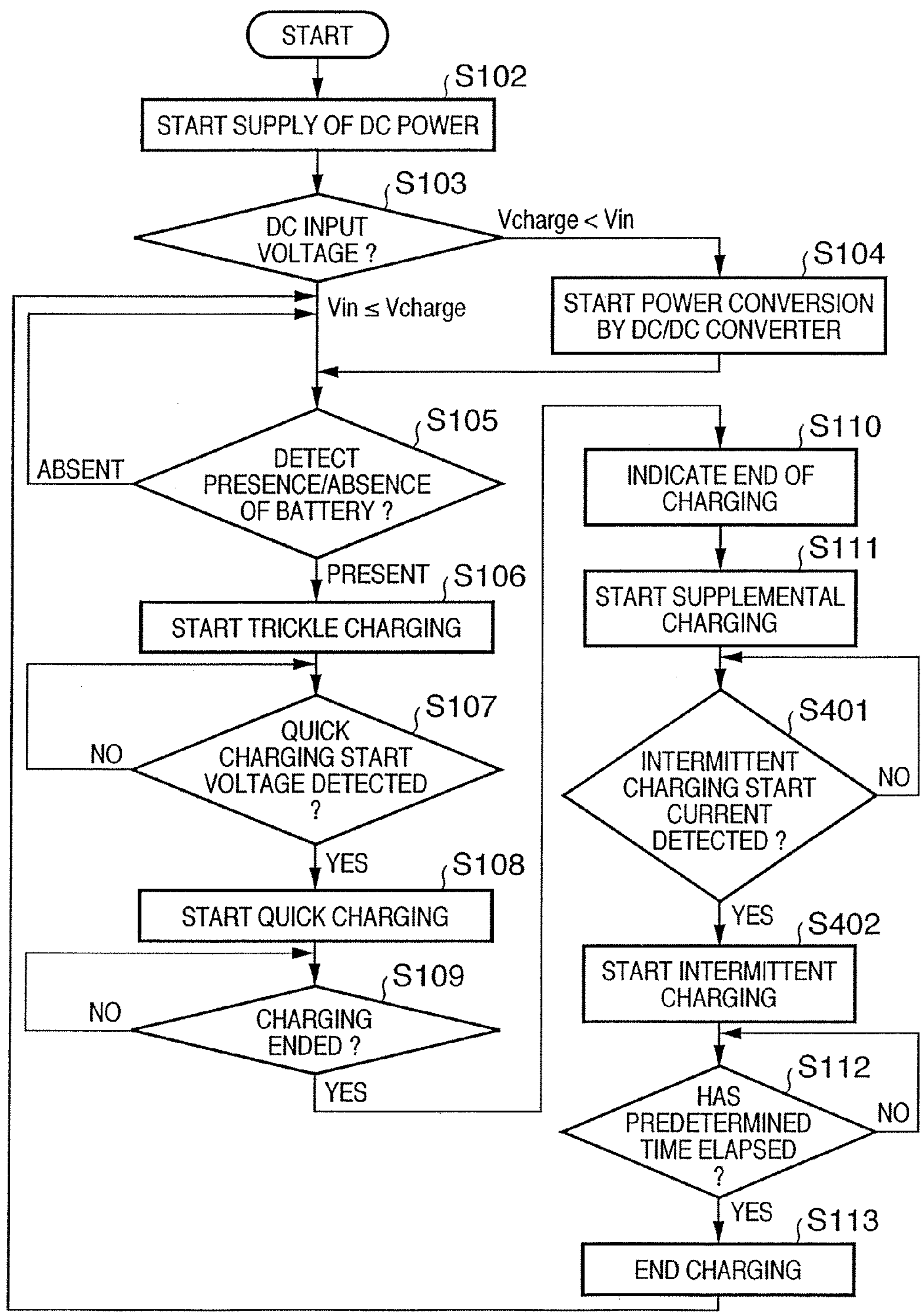
FIG. 13 is a flow chart for explaining the charging operation of an MPU.

FIG. 13 is a flow chart for explaining the charging operation of the MPU 7. Processes in steps S105 to S111, S112, and S113 are the same as in FIG. 3, and a detailed description thereof will be omitted. After the start of supplemental charging, the MPU 7 detects that the charging current decreases to the preset intermittent charging start current value (S401) and starts intermittent charging (S402). When the supplemental charging timer detects the elapse of a predetermined time (S112), charging is ended (S113).

The intermittent charging is executed at the end of charging assuming a case wherein the DC input plug is disconnected before the battery 16 is detached after indicating the end of charging. In such a satiation, if the charger 1 continues the operation while keeping the end of charging indicated, the battery 16 is wastefully discharged. To prevent the wasteful discharging of the battery 16, intermittent charging is started such that the operation of the charger 1 is stopped when the DC input plug is disconnected.

Although not illustrated in FIG. 13, as a measure against the above-described case wherein the DC input plug is disconnected during charging, when the voltage across the resistor 13 for current detection is equal to or lower than a preset voltage, the MPU 7 makes an interrupt to jump the processing to step S402 to forcibly start intermittent charging. In FIG. 13, general processes which are unnecessary for the description of the present invention are not illustrated.

Generally, current ripple noise is superposed on the charging current. Hence, a circuit arrangement without any detection error or detection considering the current ripple noise is necessary for current detection. Especially, at a late time of quick charging or during the supplemental charging period when the charging current is small, intermittent charging may start before the timing D1, or the operation may return to normal supplemental charging after the start of intermittent charging due to the influence of the current ripple noise. For stable start and continuation of intermittent charging, a hysteresis is prepared in the threshold value (current value) at which intermittent charging starts at the end of charging. More specifically, the intermittent charging start current value is set small to prevent any transition to intermittent charging before the timing D1. After the start of intermittent charging, the threshold value is set large to prevent return to normal supplemental charging.

Let $I_{th1}$ be the threshold value of the charging current at which intermittent charging is forcibly started, $I_{th2}$ be the threshold value of the charging current at which supplemental charging starts, and $I_{th3}$ be the threshold value of the current at which intermittent charging starts during supplemental charging. These threshold values normally have a relationship given by $$I_{th1} < I_{th3} < I_{th2}$$

[Connection Form of Charger and Power Adapter]

Figure 14:
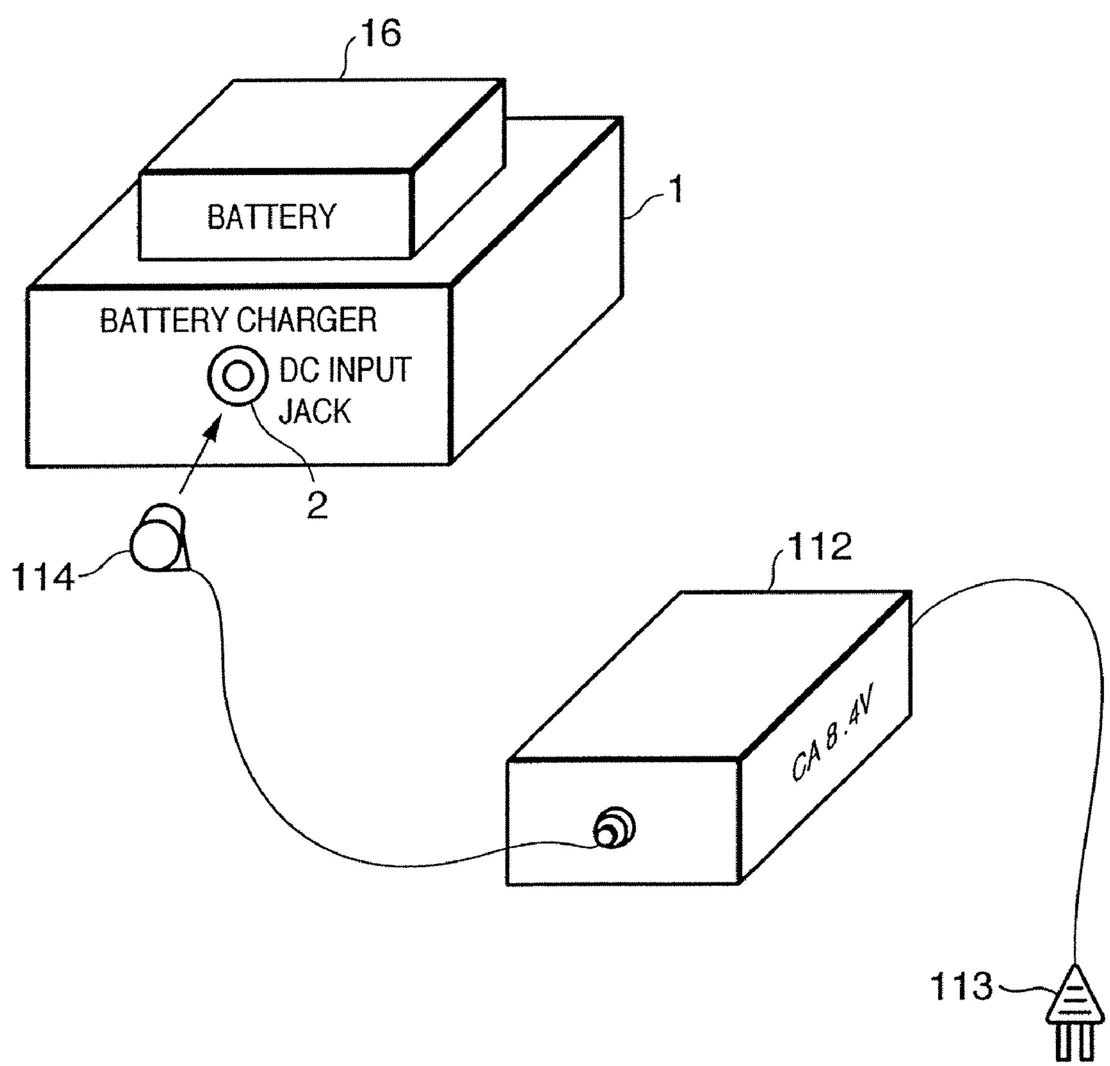
FIG. 14 is a view showing an example of a connection form of the charger and a power adapter according to the fourth embodiment.
Figure 15:
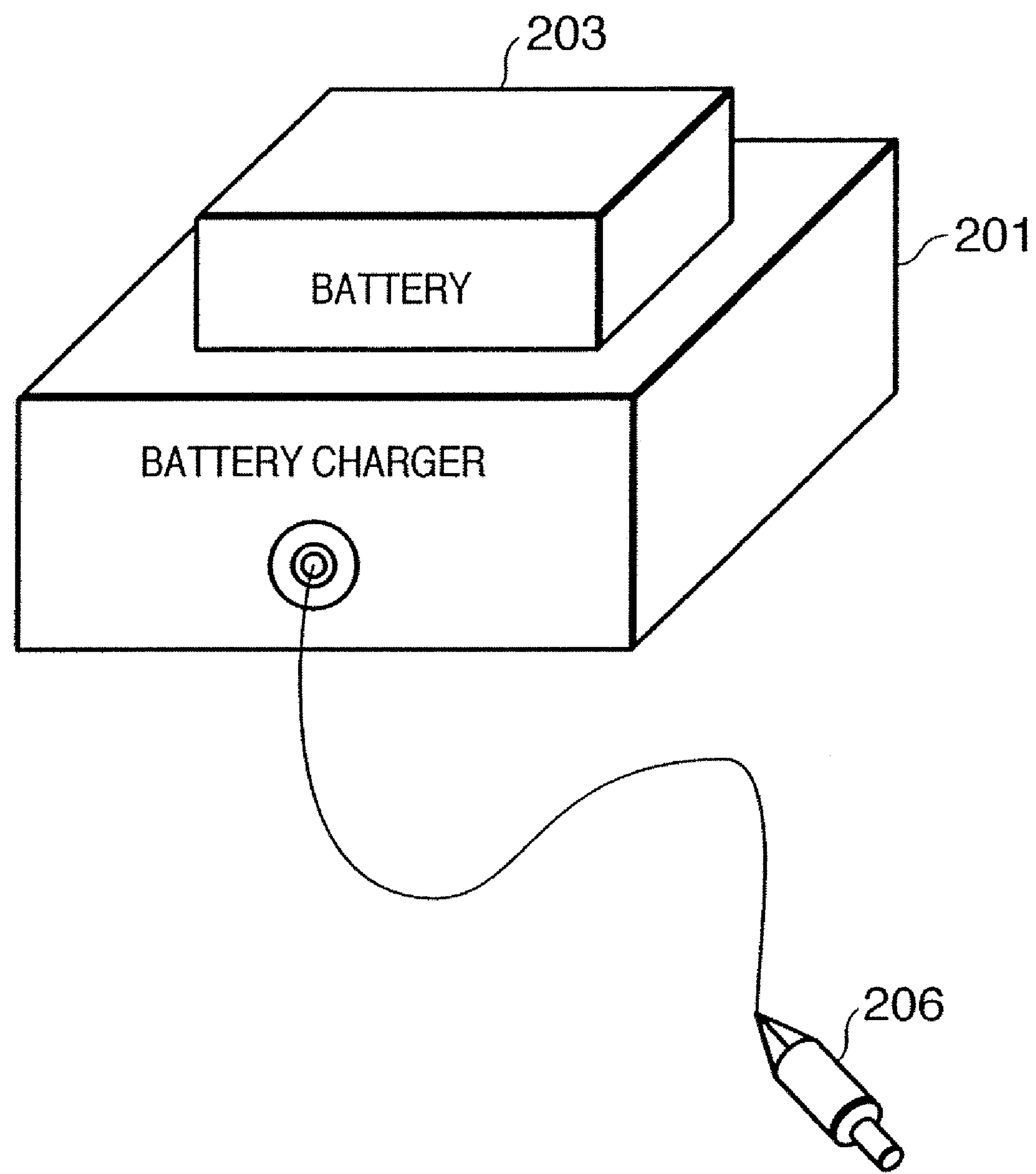
FIG. 15 is a view showing the connection form of a charger and a power adapter.

FIG. 14 is a view showing an example of a connection form of the charger 1 and a power adapter according to the fourth embodiment.

Referring to FIG. 14, a power adapter 112 converts an AC power supplied from an AC input plug 113 into a DC 8.4-V power and supplies the DC power constant-voltage/constant-current-controlled for charging of the battery 16 to the DC input jack 2 through a DC input plug 114.

As described above, the charger 1 according to the fourth embodiment has no blocking element. However, even when the DC input plug is disconnected during charging, no power backflow from the battery 16 occurs, and the battery 16 is not wastefully discharged. In addition, intermittent charging is executed at the end of charging. Accordingly, even when the DC input plug is disconnected before the battery 16 is detached, the battery 16 is not wastefully discharged.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

The invention claimed is:

1. A battery charger for charging a battery, comprising:

a first input unit configured to input first direct current power having a voltage higher than a charging voltage of the battery;

a converter configured to convert the first direct current power into direct current power having a voltage different from the voltage of the first direct current power, and to output the converted direct current power to the battery;

a second input unit configured to input second direct current power having a voltage lower than the charging voltage, and to output the second direct current power to the battery;

a connection detector configured to detect a connection state between a plug and said second input unit; and a charging controller configured to set a quick charging start voltage of the battery when connection between the plug and said second input unit is detected by said connection detector, wherein the quick charging start voltage is higher than the charging voltage set in the connection is not detected by said connection detector.

2. A control method of a battery charger having a first input unit that inputs first direct current power having a voltage higher than a charging voltage of a battery, a converter that converts the first direct current power into direct current power having a voltage different from the voltage of the first direct current power and outputs the converted direct current power to the battery, and a second input unit that inputs second direct current power having a voltage lower than the charging voltage and outputs the second direct current power to the battery, the method comprising:

detecting a connection state between a plug and the second input unit; and setting a quick charging start voltage of the battery when connection between the plug and the second input unit is detected, wherein the quick charging start voltage is higher than the charging voltage set in the connection is not detected.

* * * * *